(12) United States Patent  
Sunkara et al.

(10) Patent No.: US 9,202,181 B2  
(45) Date of Patent: Dec. 1, 2015

(54) METHOD FOR TARGET DRIVEN CHARTING IN FLAT SHEET INDUSTRIES

(75) Inventors: Gokul Mahendra babu Sunkara, Bangalore (IN); Lingathurai Palanisamy, Bangalore (IN); Mangesh Dattatraya Kapadi, Bangalore (IN)

(73) Assignee: Honeywell ASCa Inc., Mississauga (CA)

( * ) Notice: Subject to any disclaimer, the term of this patent is extended or adjusted under 35 U.S.C. 154(b) by 548 days.

(21) Appl. No.: 13/554,207

(22) Filed: Jul. 20, 2012

(65) Prior Publication Data

US 2014/0025189 A1    Jan. 23, 2014

(51) Int. Cl.
*G06Q 10/00* (2012.01)
*G06Q 10/04* (2012.01)
*G05B 19/418* (2006.01)

(52) U.S. Cl.
CPC ........ *G06Q 10/043* (2013.01); *G05B 19/41865* (2013.01); *G05B 2219/32252* (2013.01)

(58) Field of Classification Search
CPC .................................................... G06Q 10/043
See application file for complete search history.

(56) References Cited

U.S. PATENT DOCUMENTS

| | | | |
|---|---|---|---|
| 4,551,810 A * | 11/1985 | Levine | 700/182 |
| 4,554,635 A * | 11/1985 | Levine | 700/183 |
| 5,815,398 A * | 9/1998 | Dighe et al. | 700/217 |
| 6,745,099 B2 | 6/2004 | Hoffman | |
| 6,772,037 B2 | 8/2004 | Palanisamy | |
| 7,321,806 B2 * | 1/2008 | Kapadi et al. | 700/127 |
| 7,610,114 B2 | 10/2009 | Kapadi | |
| 7,987,016 B2 | 7/2011 | Karhu | |
| 8,364,303 B2 * | 1/2013 | Fahl et al. | 700/122 |
| 2006/0197769 A1 * | 9/2006 | Lee | 345/563 |
| 2007/0112451 A1 * | 5/2007 | Clayton | C03B 33/037 700/100 |
| 2008/0288100 A1 * | 11/2008 | Moisio et al. | 700/127 |

FOREIGN PATENT DOCUMENTS

| EP | 1956456 B1 | 8/2008 |
|---|---|---|
| EP | 1956456 B1 | 7/2010 |

OTHER PUBLICATIONS

Chauhan, et al "Roll Assortment Optimization in Paper Mill—An Integer Programming Approach" 2008 XP26917844 Whole Document.

(Continued)

*Primary Examiner* — Christopher E Everett
(74) *Attorney, Agent, or Firm* — Cascio Schmoyer & Zervas (57) ABSTRACT

Optimal charting patterns for charting of raw rolls/sheets from flat sheet industry are produced with a processing system and includes the steps of: (a) receiving user selected business objectives; (b) receiving user selected business preferences; (c) setting targets for user selected business preferences; (d) establishing charting constraint sets; (e) generating charting patterns based on user selected business objectives and targets for user selected business preferences; and (f) selecting charting patterns based on targets for user selected business preference using an objective function, wherein the objective function includes terms related to the user selected business objectives. Target driven charting assists users in knowing the bounds (upper and/or lower) of the values for various business objectives for an individual charting run. The analysis of bounds allows for explicit understanding of the trade-offs between various business objectives and enables users to prioritize their business goals separately for each charting batch or run.

26 Claims, 2 Drawing Sheets

(56) References Cited

OTHER PUBLICATIONS

Gilmore & Gomory "A Linear Programming Approach to Cutting Stock Problem" vol. 9, 1961 pp. 849-859; XP000749214 Whole Document.

Chauhan, S. S, Allain, M., and Shopie, D. A. (2008) "Roll Assortment Optimization in Paper Mill—An Integer Programming Approach" Computer & Operation Research, 35, 614-627.

Gilmore, P. C. and Gomory, R.E. (1961) "A Linear Programming Approach to Cutting Stock Problem" Operation Research, 9, 849-859.

* cited by examiner

METHOD FOR TARGET DRIVEN CHARTING IN FLAT SHEET INDUSTRIES

FIELD OF THE INVENTION

The present invention relates to techniques for improving overall charting operation in flat sheet industries and particularly to a charting approach that takes into account the values of various business preferences and using that information to set targets to improve overall charting operations.

BACKGROUND OF THE INVENTION

A typical flat sheet industry manufactures raw rolls and/or sheets that consist of, for example, steel, paper, aluminum, and dry film products. The raw rolls (sheets) have varying widths, diameters (or length), quantity, and quality. The width and diameter (or length) of these raw rolls and/or sheets depend on the specifications of the machines that manufacture them. On the other hand, customers often order product rolls and/or sheets that have smaller dimensions that cannot be directly satisfied by the raw rolls and/or sheets produced by flat sheet manufacturers. Therefore, raw rolls and/or sheets frequently must be cut and/or trimmed into product rolls and/or product sheets that satisfy customer demand.

The process of cutting the larger sized raw rolls and/or sheets into smaller product rolls and/or sheets as specified by customer orders is typically referred to as trimming, cutting, and/or charting, depending on the type of flat sheet industry. However, for convenience only, the term charting will be used herein to mean trimming, cutting, or charting.

Charting is carried out using a set of specific equipment (e.g., winder, rewinder, sheeter, trimmer, cutter, etc) in various flat sheet industries. The equipment is generally referred to as secondary processing equipment and the process of charting is generally referred to as secondary processing. Secondary processing could be implemented in either one step or multiple steps depending on the specific dimensions that need to be charted. Multiple steps are typically required due to inherent limitations of the various secondary processing equipment, in terms of its capability in handling different dimensions.

Charting is typically carried out multiple times a day (e.g., a separate charting for each shift or separate charting for a group of customer orders referred to as a charting batch, etc). The charting process primarily includes the determination of the necessary charting patterns according to which large sized raw rolls and/or sheets are processed on secondary processing equipment to fulfill a set of customer orders. The attributes of the customer orders are typically width, diameter (or length), ordered quantity (within certain tolerances), product type and delivery date.

The conventional approach to achieve better charting yields relies on using standard sizes along with customer order dimensions while minimizing the quantity of raw rolls/sheets required to fulfill customer orders. This approach has the inherent problem of delivering a quantity that is less than 'target customer order quantity' but that is within a lower tolerance on 'target customer order quantity'. The changing customer base in today's competitive industrial world results in irregular demand sizes with no or very few standard sizes; this limits the conventional approach in finding better charting yields. Furthermore, as standard sizes do not have associated delivery dates, the conventional approach invariably affects the production schedule because of the time consumed in producing standard sizes.

The majority of prior art charting optimization approaches focus on either minimization of charting loss or minimization of the number of raw rolls (or sheet quantity) required (either by manufacturing or from available inventory) to fulfill the customer orders. For example, Gilmore and Gomory, (1961), "A Linear Programming Approach to Cutting Stock Problem," *Operations Research*, 9, 849-859, considers minimization of raw rolls to fulfill customer orders as only one business objective for single stage/level charting and ignores other business objectives. The few multi stage/level charting approaches that are described, such as in U.S. Pat. No. 7,987,016 to Karhu, focus on other business objectives like effective utilization of the secondary processing equipment without giving sufficient priority to charting loss minimization and hence do not guarantee the optimal charting yield. A few other charting approaches consider the standard sizes to improve the charting yield but they fail to limit the use of standard sizes resulting in production of large quantity for them and thereby affect the schedule delivery dates for confirmed customer orders. See, for example, Chauhan et al., (2008), "Roll Assortment Optimization in Paper Mill—An Integer Programming Approach," *Computer & Operation Research*, and U.S. Pat. No. 6,745,099 to Hoffman. Furthermore, the standard sizes considered in such approaches often are not part of any future customer orders resulting in increased finished product inventory and locked capital.

In addition, the currently available charting solution approaches, such as those described in U.S. Pat. No. 7,610,114 to Kapadi et al. and EP1956456 B1, do not provide information on bounds (upper and/or lower) of various business objectives even though they consider all the business goals as part of the objective function. From the charting solutions obtained using these currently available approaches it is difficult to judge the deterioration (if any) in charting yield and improvement (if any) in other business objectives compared with the values obtained for all business objectives when only charting loss minimization approach is used. In summary, these approaches do not demonstrate to users the explicit trade-off between various business objectives for a charting batch or run. Furthermore, these approaches completely explore neither the flexibility available in charting activity nor multiple solutions having same charting loss to improve upon all the business goals of the charting process. In other words, these approaches do not provide any insight to enable users to prioritize the business goals as per their needs separately for each charting batch or run and hence fall short in achieving a delicate balance between all the business goals to improve the overall charting operation and not only the charting yield.

With changing economic conditions, the concept of warehouse is getting thinner and the industry-operating model is fast moving from make-to-stock to make-to-orders concept. Therefore, the business goals for a charting process are now a balanced combination of the following factors: (1) Minimization of quantity loss during charting. (2) Maximum utilization of available inventory of raw or semi-processed rolls/sheets. (3) Minimization of the number of raw rolls (or raw sheet quantity) required to be manufactured to fulfill a set of customer orders (from a batch). (4) Minimization of deviation of 'quantity delivered' from 'target order quantity' for each "must make" customer order, which is high priority order that must be fulfilled completely within specific quantity tolerance limits. (5) Minimization of quantity produced for optional orders. The optional orders are either standard size orders (for which there is regular flow of customer orders) or customer orders with future delivery date. The production of quantity for optional orders results in handling of finished product inventory at manufacturing site and lock-in of capital. (6) Maximization of throughput of all secondary processing equipments. And (7) Minimization of setup required on secondary processing equipments.

Although the primary goal of charting process is always to minimize charting/trimming loss, the other business objectives carry relevant importance and cannot be ignored. Currently available charting solutions either provide maximum priority to charting loss minimization or consider a user-defined combination of all these business goals. In the former approach charting process is not efficient though charting yield is best while in the latter approach the primary objective of trimming/charting loss minimization is not adequately considered. Currently available charting solutions when implemented addresses a few (or all) of the above listed business goals along with charting loss minimization yield; the results keep the user unaware with respect to deviation from optimal charting loss (obtained in absence of other business goals) and improvement (if any) in other business goals against pure charting loss minimization approach. In absence of the said insight into the charting result, currently available charting solutions do not allow users to prioritize the business goals as per their needs for each charting batch or run. Hence, the user of currently available charting solutions finds it difficult to achieve a delicate balance between all the business goals to improve the overall charting operation and not just the charting yield.

Finally, currently available charting solutions completely fail to explore the flexibility available in charting activity and multiple solutions having same charting loss to improve upon all the business goals of the charting process. It is important to understand that multiple solutions providing the same percentage of charting loss can perform differently with respect to other business objectives or goals. For example, a solution needs fewer number of unique charting patterns as compared with other solutions having the same percentage charting loss; this in turn results in minimum setup time on secondary processing units. Other solutions having the same percentage trim loss might be producing a minimum quantity for optional orders. Or a slight deterioration in charting percentage yield (which is 100 minus charting percentage loss) helps improve the available inventory (of raw or semi-processed rolls/sheets) utilization (mainly in the case of inventory nearing its expiry) and/or throughput of secondary processing units along with minimum setup time. When such deterioration (if any) in charting yield is acceptable to a user against the improvement in other business objectives, then the new result becomes the best solution for a given charting batch or run.

SUMMARY OF THE INVENTION

The present invention is based in part on the development of a novel charting approach which involves firstly knowing the bounds (lower and/or upper) for the values of various business goals and secondly using this information to set targets to improve upon the overall charting operation. The second aspect is critical in providing a charting approach to help users prioritize their business goals as per their assessment of each charting batch or run. Charting of raw or inventory rolls and/or sheets to fulfill customer orders is complex and difficult when trying to optimize upon all the above business goals. The present invention provides a target driven charting operation for the flat-sheet industry, which is a robust, efficient, flexible but consistent charting protocol, that enables production facilities to meet customer demands with optimal efficiency (with respect to all other business goals).

Accordingly, in one aspect, the invention is directed to a method of producing optimal charting patterns for charting of raw rolls/sheets from flat sheet industry, the method implemented by a processing system, the method including the step of:

(a) receiving use selected business objectives;
(b) receiving user selected business preferences;
(c) setting targets for user selected business preferences;
(d) establishing charting constraint sets;
(e) generating charting patterns based on user selected business objectives and targets for user selected business preferences; and
(f) selecting charting patterns based on targets for user selected business preference using an objective function, wherein the objective function includes terms related to the user selected business objectives.

DETAILED DESCRIPTION OF PREFERRED EMBODIMENTS

Definitions

"Charting Process/Operation" means the process of cutting the larger sized raw rolls and/or sheets into smaller product rolls and/or sheets as specified by customer orders.

"Must Make Order" means a high priority customer order that needs to be fulfilled completely within specific quantity tolerance limits.

"Optional Order" means either standard size order or customer order with future delivery date or low priority customer order. An optional order need not be produced or if produced can be partially or completely fulfilled.

"Charting Order Type" means whether the order is a must make or optional order.

"Charting Batch" means a set of must make and optional orders of same or similar product type which are combined together and produced by charting of larger sized raw and/or inventory rolls and/or sheets.

"Charting Loss" means loss of quantity during charting process. It is equal to quantity used for charting minus quantity made for orders (includes must make and optional both).

"Charting Percentage Loss" means the ratio of charting loss to quantity used for charting.

"Charting Percentage Yield" means 100 minus charting percentage loss.

Charting Operation

The charting operation in flat sheet industries is a process of cutting larger sized raw rolls and/or sheets into smaller product rolls and/or sheets as specified by customer orders. The flat sheet industry includes, for example, steel, paper, aluminum, dry film, etc. The attributes of the customer orders are typically width, diameter (or length), ordered quantity (within certain tolerances), product type and delivery date. The charting operation is carried out separately for each charting batch. A charting batch is a set of must make customer orders and optional orders of the same or similar product type that are combined together in order to be produced by charting of larger sized raw rolls and/or sheets.

Charting is carried out using a set of specific equipment (e.g. winder, rewinder, sheeter, trimmer, cutter, etc) in various flat sheet industries. The equipment is generally referred to as secondary processing equipment and the process of charting is generally referred to as secondary processing. Secondary processing could be implemented in one step or multiple steps depending on the specific dimensions that need to be charted. Multiple steps are typically required due to inherent capacity limitations of the various secondary processing equipment in handling different dimensions.

The charting process determines the charting patterns according to which large sized raw rolls and/or sheets are optimally processed on secondary processing equipment to fulfill the orders in the charting batch. The determination of charting patterns involves generation of charting patterns as per the limitations of secondary processing equipment, size attributes (width, length/diameter, core diameter, preference for non-edge roll, etc) of charting batch orders, size attributes (width, length/diameter, core diameter, defects of multiple types such as bad spot defects, dead zone defects, etc) of available inventory (if any) and charting operational constraints. The limitations of secondary processing equipment include but not limited to maximum (and/or minimum) width of raw/product roll and/or sheet handled, maximum (and/or minimum) length/diameter of raw/product roll and/or sheet handled, edge trim required, number of available knives, minimum (and/or maximum) distance between two knives, and width consumption by knife. The charting operational constraints, for example, can be minimum width/deckle utilization of raw rolls or sheets, minimum length utilization of raw rolls or sheets, multiple stage or single stage charting, etc. The generation of charting patterns is described in U.S. Pat. No. 7,610,114 to Kapadi et. al., which is incorporated herein by reference, and which is referred to herein as the Kapadi Patent.

The determination of charting patterns also involves selection from generated charting patterns according to additional secondary processing equipment limitations, other attributes (maximum quantity, minimum quantity for only must make orders, rolls/sheets per delivery pack, etc) of charting batch orders, other attributes (product type, number of inventory rolls of same size attributes, time to expiry, preference for usage, etc) of available inventory (if any) and additional charting operational constraints to optimize the charting operation as per user set priorities of the various business goals. The additional secondary processing limitations include but not limited to maximum (and/or minimum) number of backstand rolls handled, maximum (and/or minimum) weight of raw rolls or sheets at backstand, maximum (and/or minimum) length of rolls at backstand, number of stackers, etc. Additional charting operational constraints can include, for example, preference of specific order begin fulfilled from available inventory, and preference to use similar product type to fulfill order etc. The generation and selection of charting patterns with two business objectives (minimization of charting loss and maximization of utilization of inventory) is described in the Kapadi Patent. The method described in the Kapadi Patent of charting raw rolls and/or sheets of flat sheet stock comprises (i) generating charting patterns using constraint logic programming, (ii) matching the charting patterns and available raw rolls and/or sheets of flat sheet stock, and (iii) selecting the optimal patterns from those matching charting patterns and available raw rolls and/or sheets using mixed integer linear programming.

Target Driven Charting

A target driven charting approach of the present invention helps users know the bounds (upper and/or lower) of the values for various business objectives for individual charting run. The analysis of bounds allows users to explicitly understand the trade-offs between various business objectives and prioritize their business goals separately for each charting batch or run. The users can set the targets on various business goals to improve the overall charting operation and not just the charting yield.

In target driven charting, users preferably set targets or strategies such as, for example: (1) Minimum charting yield (or maximum charting loss) percentage. (2) Maximum quantity of optional orders produced. (3) Maximum percentage/fraction for quantity produced for optional orders (it is the ratio of quantity produced for optional orders to quantity produced for all orders). (4) Maximum number of optional orders for which quantity is produced. (5) Minimum throughput for secondary processing equipment. (6) Maximum number of charting patterns allowed to minimize set-up time and cost. (7) Minimum and/or maximum percentage/quantity of available inventory utilized in charting solution. And (8) Minimum or maximum percentage of order quantity fulfilled from inventory (order specific or overall).

These targets can be obtained by knowing the bounds for various business objectives. However, it is should be emphasized that it is not necessary to use the information about bounds on values of various business objectives to set targets. Experienced users can just set these targets with pre-prioritized business objectives or derive the targets by analyzing the charting batch data or history of charting operation.

The present invention is particularly suited for improving the charting yields in flat sheet industries but it can be applied to enhance charting operations in general. The flat sheet industry, for example, process steel, paper, aluminum, dry film, etc. The invention allows the user to understand the trade-off between various business objectives for each charting run explicitly. The explicit understanding of the trade-off helps the user set targets for values of various business goals of charting process and thereby prioritize the business goals.

A primary goal of the target driven charting approach is to achieve optimal overall charting operation and entails knowing the bounds (lower and/or upper) on values of business goals and then applying this information to improve upon the overall charting operation. The user can derive the upper bound on charting loss (or lower bound on charting yield), lower bounds on secondary processing equipments throughput, upper bound on required setups by solving charting problems relating to only must make orders with charting loss minimization as the only objective. It is important to note that the charting loss, throughput and setups can be further improved by use of optional orders in the charting problems. Additionally, the user can obtain the lower bound on the number of raw rolls (or raw sheet quantity) required to be manufactured to fulfill a set of customer orders from the charting batch by setting it as the only objective function in the charting problem. Similarly, the user can obtain the upper bound on usage of available inventory by considering it as the only objective function in charting problems with only must make orders. It is important to note that available inventory is generally not used to fulfill the optional orders. The charting approach described in the Kapadi Patent can be used to derive the bounds on values of various business goals. One can use the charting approach in the Kapadi Patent to solve charting problem without available inventory by considering each primary manufacturing equipment size limitations to create pseudo stock without any limit on its availability. It is equally important to understand that an experience user can calculate these bounds by analysis of charting batch data and hence knows these bounds without employing charting. Therefore use of charting approaches like those explained in the Kapadi Patent is optional in determining the bounds on values of various business objectives.

The analysis of the bounds on values of various business objectives explicitly explains the trade-off between various business goals for a charting batch or run. The explicitly known trade-off helps a user prioritize business objectives for a given charting batch and hence the said information on bounds can be used to set targets such as the eight exemplary targets delineated above which are not exhaustive as those skilled in charting operations can set targets for goals and implement the overall approach of target driven charting. It is furthermore important to note that it is not necessary to use the information about bounds on values of various business objectives to set targets. The charting mathematical formulation explained herein is then used to solve the charting problem with these set targets to obtain optimal overall charting operation.

Mathematical Formulation

The charting mathematical formulation required to realize the novel charting technique involves generation of charting patterns and selection from generated charting pattern to optimize overall charting operation. The discussion for generation of and selection from charting patterns is given above. The generation of charting patterns can be implemented using the pattern generation methods described in the Kapadi Patent. The representative pattern selection formulation for one dimensional (width-wise) charting for roll order only charting batch is explained below which also includes the constraints for user set targets. It is important to note that one dimensional (widthwise) charting and the roll only charting batch are considered for convenience only and the formulation can be easily extended for two dimensional charting of a charting batch containing both sheet and roll orders. An example of mathematical formulation for two-dimensional charting is illustrated in the Kapadi Patent The pattern selection that is part of charting mathematical formulation required to realize the novel target driven charting approach presented here. This pattern selection formulation includes a new set of target constraints. In this pattern selection formulation, the present invention handles fulfilling of N must make orders from a known type of raw rolls M. The raw roll could be either a roll that can be produced from the primary manufacturing equipment (so the width is equal to the primary manufacturing machine width) or already produced inventory rolls of different sizes. The raw rolls are grouped based on size attributes (e.g., width and diameter/length) and the index used to represent these groups is g. Each raw roll group g has a width WRg, diameter DRg (or length LRg), core diameter CRg. The number of raw rolls available for each group g is represented by MXNRg. It is important to note that the parameter MXNRg carries the meaning only if the raw roll group is for inventory raw rolls and whether the raw roll is inventory raw roll or not is represented by binary parameter $SG_g$ (1 means belongs to inventory raw rolls). The weight of each raw roll from roll group g ($RLWGTR_g$) is known a priori and can be calculated using the following equation:

$$RLWGTR_g = \text{DENSITY}\left(\frac{\pi}{4}\right)(WR_g)(DR_g^2 - CR_g^2) \forall [g]$$

Where, density DENSITY is defined as weight of paper per unit volume. The size attributes of each must make customer order i are width $W_i$, a nominal diameter $D_i$ (or Length $L_i$), core diameter $C_i$ and quantity $Q_i$. The quantity produced for the customer order is required to be within given tolerance specified by a lower quantity limit $QMIN_i$ and upper quantity limit $QMAX_i$. The diameters of each product roll (the roll(s) to be delivered to the customer) for order i can be within a given tolerance limit on the nominal diameter specified. For convenience only we are considering specified order diameter $D_i$ in the formulation. The weight of each roll $RLWGT_i$ for must make order i can be calculated using the following equation:

$$RLWGTR_i = \text{DENSITY}\left(\frac{\pi}{4}\right)(W_i)(D_i^2 - C_i^2) \forall [i]$$

To improve charting efficiency a set of O optional orders is used. Each optional order o has width $WO_o$, diameter $DO_o$, core diameter $CO_o$ and maximum quantity $QMAX_o$. It should be noted that if an order is an optional order, the minimum $QOMIN_o$ for that order can be set to zero. The weight of each roll $RLWGTO_o$ for optional order o can be calculated using the following equation:

$$RLWGTO_o = \text{DENSITY}\left(\frac{\pi}{4}\right)(WO_o)(DO_o^2 - CO_o^2) \forall [o]$$

The charting formulation involves pattern generation and pattern selection steps. A detailed description and formulation of the pattern generation step is provided in the Kapadi Patent. Each pattern generated from the pattern generation step is represented by index p and the total number of patterns is P. Each Pattern contains information about pattern order multiple $POM_{p,i}$ which is number of multiples of each must make order appears in that pattern. Similarly for optional orders $POMO_{p,o}$ represents number of multiples of each optional order in the given pattern. Each pattern can be associated with more than one raw roll group. The association with a particular raw roll group is represented by the parameter $PG_{p,g}$ which takes value 1 if a pattern belongs to the particular raw roll group otherwise zero.

The pattern selection step of current formulation for target driven charting approach involves determining $n_{p,g}$ which represents number of times the pattern p is for raw roll group g. During pattern selection step $n_{p,g}$ should be zero for all patterns that are not suitable on all the raw roll groups.

$$\sum_{p=1}^{P} \sum_{g=1}^{M(:PG_{p,g}=0)} n_{p,g} \leq 0$$

Furthermore, if the raw roll group is for inventory rolls then the number of rolls used by all suitable patterns must be less than maximum number of raw rolls available for the said raw roll group. Hence, $$\sum_{p=1}^{P(:PG_{p,g}=1)} (n_{p,g}) \leq (MXNR_g) \forall [g: SG_g = 1)]$$

During the pattern selection step all must make orders must be fulfilled within the order specified quantity range ($QMIN_i$ & $QMAX_i$).

$$\sum_{p=1}^{P} \sum_{g=1}^{M(:\, PG_{p,g}=1)} (POM_{p,i})(n_{p,g})(RLWGT_i) \le QMAX_i \; \forall \, [i]$$

$$\sum_{p=1}^{P} \sum_{g=1}^{M(:\, PG_{p,g}=1)} (POM_{p,i})(n_{p,g})(RLWGT_i) \le QMIN_i \; \forall \, [i]$$

The optional order is used to improve (if possible) charting efficiency and help improve other business targets. The pattern selection step may make use of optional orders up to the maximum quantity $QOMAX_o$ set by the user, if its usage helps improve the charting objectives. Hence, $$\sum_{p=1}^{P} \sum_{g=1}^{M(:\, PG_{p,g}=1)} (POMO_{p,o})(n_{p,g})(RLWGTO_o) \le (QOMAX_o)(oos_o) \; \forall \, [o]$$

Here $oos_o$ is a binary variable which takes non-zero value when an optional order o is used to improve charting objectives.

New Set of Target Constraints

The set of target constraints are the constraints which are used to implement the targets set by the user. The example targets are listed in detail in other sections of this specification. It is important to note that it is not necessary to include all the target constraints for a charting batch. The inclusion can be based on user's need. Here we are explaining how to add constraints related to targets. This exercise is not exhaustive as a person with ordinary skill with the benefit of this disclosure can readily add additional target constraints.

It is important to note that optional orders are either customer orders with future delivery date or standard size orders. Hence, production for optional orders increases finished product inventory and hence a user might want to limit the finished product inventory quantity or finished product inventory for only few number of optional orders. The parameter TNOO indicates maximum number of optional orders for which production is allowed in current charting batch while TMOQ indicates the maximum limit on quantity to be produced for optional orders. It is important to limit the quantity manufactured for optional orders as it has potential to affect the delivery schedule for must make orders.

$$\sum_{o=1}^{O} oos_o \le TNOO$$

$$\sum_{o=1}^{O} \sum_{p=1}^{P} \sum_{g=1}^{M(:\, PG_{p,g}=1)} (POMO_{p,o})(n_{p,g})(RLWGTO_o) \le TMOQ + aq$$

Here aq is flexibility in the system in case the charting problem is infeasible with set target on optional order quantity. The variable aq represents additional optional order quantity added into the set target. It is important to note that aq will be zero when there is a feasible solution within the user defined optional order quantity target. The maximum value it can take is sum of all maximum optional order quantity.

Another way of setting target on optional order quantity is limiting the production of optional order quantity to a target optional order percentage OOPER of the total quantity produced for the charting batch. Hence the optional order quantity target constrain can alternatively be substituted or used in conjunction with constrain below.

$$(1 - OOPER) \sum_{o=1}^{O} \sum_{p=1}^{P} \sum_{g=1}^{M(:\, PG_{p,g}=1)} (POMO_{p,o})(n_{p,g})(RLWGTO_o) \le$$

$$(OOPER) \sum_{i=1}^{N} \sum_{p=1}^{P} \sum_{g=1}^{M(:\, PG_{p,g}=1)} (POM_{p,i})(n_{p,g})(RLWGT_i) + aq$$

The ageing inventory raw rolls would enforce the user to make use of them in current charting batch. This need can be captured by a target minimum stock percentage $MNSPER_g$ for each raw roll group. This could be zero when the raw rolls are not from inventory.

$$\sum_{p=1}^{P(:\, PG_{p,g}=1)} (n_{p,g}) \ge (MNSPER_g)(MXNR_g) \forall \, [g(:\, SG_g = 1)]$$

The target on quantity to be used from individual raw roll group can also be used along with an additional target SGPER on minimum percentage of inventory roll quantity to be used in current charting batch. It is important to note that target SGPER and $MNSPER_g$ can be used simultaneously or separately based on user requirements on utilization of inventor raw rolls.

$$\sum_{g=1}^{M(:\, SG_{p,g}=1)} \sum_{p=1}^{P(:\, PG_{p,g}=1)} (n_{p,g})(RLWGTR_g) \ge$$

$$(SGPER) \sum_{g=1}^{M(:\, SG_{p,g}=1)} (MXNR_g)(RLWGTR_g)$$

The user would also want to reduce the number of selected patterns in the solution in order to minimize the change over time. This target on maximum number of patterns MXPAT is used to limit number of patterns selected as follows:

$$\sum_{p=1}^{P} ps_p \le MXPAT$$

$ps_p$ is a binary variable that would take non-zero value when a pattern is selected. This binary variable is determined in conjunction with $n_{p,g}$ as follows:

$$\sum_{g=1}^{M(:\, PG_{p,g}=1)} n_{p,g} \le (MXSETS)(ps_p) \forall \, [p]$$

$$\sum_{g=1}^{M(:\, PG_{p,g}=1)} n_{p,g} \ge (ps_p) \forall \, [p]$$

The above two constrains would set non zero values for $ps_p$ only when $n_{p,g}$ is non zero.

The user can define a target percentage trim loss TLPER for the charting batch based on operating constraints. TLPER would take values from 0 to 1. For 100 percentage loss TLPER would be 0.1. The constrain to achieve target trim loss percentage is shown below:

$$\sum_{i=1}^{N}\sum_{p=1}^{P}\sum_{g=1}^{M(:PG_{p,g}=1)}(POM_{p,i})(n_{p,g})(RLWGT_i) +$$

$$\sum_{o=1}^{O}\sum_{p=1}^{P}\sum_{g=1}^{M(:PG_{p,g}=1)}(POMO_{p,o})(n_{p,g})(RLWGTO_o) \geq$$

$$(1-TLPER)\sum_{p=1}^{P}\sum_{g=1}^{M(:PG_{p,g}=1)}(n_{p,g})(RLWGTR_g)$$

The Objective Function

The ultimate objective of charting operation is minimizing the total losses through the entire operation. The objective below precisely does that with flexibility aq to allow usage of more optional orders to reduce the chances of infeasibility and to provide a solution within the target trim percentage losses. Factor_aq is a parameter that will allow weighing the additional optional order quantity less with respect to actual charting loss quantity. Similar flexibility can be created with respect to other target constraints.

$$\min (Factor\_aq)(aq) + \left(\sum_{p=1}^{P}\sum_{g=1}^{M(:PG_{p,g}=1)}(n_{p,g})(RLWGTR_g)\right) -$$

$$\left(\sum_{i=1}^{N}\sum_{p=1}^{P}\sum_{g=1}^{M(:PG_{p,g}=1)}(POM_{p,i})(n_{p,g})(RLWGT_i) +\right.$$

$$\left.\sum_{o=1}^{O}\sum_{p=1}^{P}\sum_{g=1}^{M(:PG_{p,g}=1)}(POMO_{p,o})(n_{p,g})(RLWGTO_o)\right)$$

As is apparent, the formulation given here is representative of the concept of target driven charting approach.

Application of the Target Driven Charting

The objective of target driven charting is to attain a delicate balance between all the business goals and thereby improve the overall charting operation and not only charting yield. Possible business goals for charting process can be, for example: (1) Minimization of quantity loss during charting (generally referred as "trimming loss" or "charting loss"). (2) Maximum utilization of available inventory of raw or semi-processed rolls/sheets. (3) Minimization of the number of raw rolls (or raw sheet quantity) required to be manufactured to fulfill a set of customer orders (from a batch). (4) Minimization of deviation of 'quantity delivered' from 'target order quantity' for each must make customer order. They must make orders are high priority orders which needs to be fulfilled completely within specific quantity tolerance limits. (5) Minimization of quantity produced for optional orders. The optional orders are either standard size orders (for which there is regular flow of customer orders) or customer orders with future delivery date. It is important to note that the production of quantity for optional orders results in handling of finished product inventory at manufacturing site and lock-in of capital. (6) Maximization of throughput of all secondary processing equipments. And (7) Minimization of setup required on secondary processing equipment. The list of the business objectives is not exhaustive as additional business goals can be employed for the charting operation.

The target driven charting approach involves generation of patterns and selection from patterns to optimize the overall charting operation. Both the generation of patterns and selection from generated patterns include constraints that are employed in conventional charting approaches, such as that in the Kapadi Patent, along with new set of target related constraints. The example case of this new set of target related constraints is given in detailed description section of current document. The example case includes a new set of constraint related to targets and can be selected from one or more of the eight exemplary targets presented above.

It is important to note that it is not necessary to include all the constraints from new set of example case for each charting batch. It means the user of target driven charting approach can use any combination of target constraints. Additionally, the list of targets discussed in the current document is not exhaustive and anybody having ordinary skill in charting operation can set targets for business goals outside the said list without violating the overall approach of target driven charting.

The 'generation of patterns' and 'selection from patterns' routines without new set of target related constraints can be used to obtain bounds on the values of various business objectives. This part can be run multiple times to obtain bounds on various business objectives, depending upon the need of the user. The bounds can be analyzed (manually or by a computer written program) to explicitly understand the trade-off between various business objectives separately for each charting batch. The information obtained can then be used to set targets for various business objectives. For example, for a particular charting batch there exist multiple solutions having charting loss as 0.11%. One solution needs 27 distinct pattern and another only 9. The solution with distinct patterns 9 can be obtained by setting target on maximum charting loss as 0.11% and objective of charting operation as number of pattern minimization for setup cost minimization. The example given here is illustrative only. The 'generation of patterns' and 'selection from patterns' routines with a new set of target related constraints can then be used to achieve optimal charting operation as per user set business priorities.

It should be noted that the practice of the invention disclosed here is only preferred and several modifications for target driven charting approach for flat sheet industries can be made without violating the general scheme of the said approach. For example, an experience user can directly set the targets without knowing bounds on value of various business objectives. The set targets will be used to solve charting problem to arrive at optimal charting operation as per user specified preferences.

In another example, the bounds on the values of various business objectives can be obtained by analysis of charting batch data by an experienced user or from past business practices. The use of conventional charting approaches to obtain the bounds on value of business objectives is also optional and one can completely eliminate use of conventional charting approaches. The bounds obtained by analysis of charting batch data by an experienced user or from past business practices can be used to set targets in invented charting mathematical formulation to achieve optimal charting operation. Simple modifications like these follow the general scheme of the target driven charting approach disclosed in the current invention.

Figure 1:
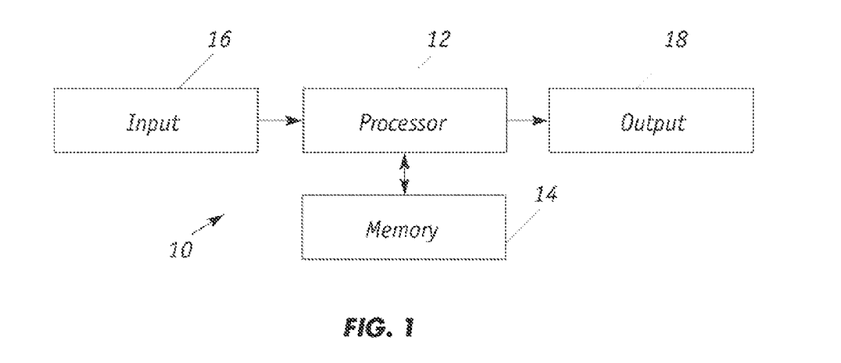
FIG. 1 illustrates a target driven charting system for implementing an optimizing model of the present invention.
Figure 2:
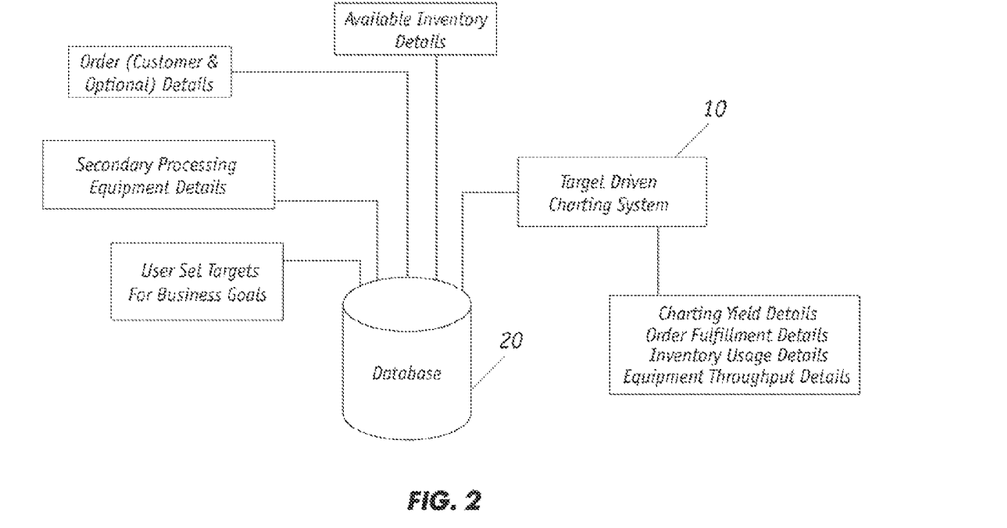
FIG. 2 illustrates operations of the target driven charting system of FIG. 1.

As depicted in FIG. 1, the above optimization model can be implemented in connection with a target order charting system 10 that includes a processor 12, a memory 14, an input device 16, and an output device 18. As shown in FIG. 2, the memory 14 includes a database 20 that is used to store information entered by the input device 16 or otherwise. For example, the database 20 stores customer order related data and available inventory details such as, for example, width, length, quality, defects, aging, and quantity data for each available raw roll group. Database 20 further stores secondary processing equipment details for the equipment that is to be used to chart the available raw stock. These details can include, for example, the width of the raw roll consumed by each knife of the secondary processing equipment, the lower and upper limits on the separation between blades of the secondary processing equipment, and the maximum number of knives used by the secondary processing equipment. Finally, database 20 stores the business goal details.

Memory 14 (FIG. 1) stores an optimization program 30 described above and shown by way of the flow chart of FIG. 3 that is executed by the target driven charting system 10 to optimally chart the patterns resulting from the orders onto the raw rolls and, as shown in FIG. 2, to output the target driven charting yield, order fulfillment, inventory usage and equipment throughput details that are used by the secondary processing equipment to produce the product rolls from the raw rolls according to the optimal charting patterns.

The output device 18 receives, for instance, the optimal charting patterns, the demand fulfillment and stock usage details. The output device 18, for example, can be a display device that displays the optimal charting patterns, the demand fulfillment and stock usage details to a user who can then enter this information into the secondary processing equipment in order to fill the customer orders. Alternatively, the output device 18 can be a drive or other device that copies the optimal charting patterns, the demand fulfillment and stock usage details onto computer readable media that can then be transferred to the secondary processing equipment that is used to fill the customer orders. As a further alternative, the output device 18 can itself be the secondary processing equipment that directly receives the optimal charting patterns, the demand fulfillment and stock usage details and uses this information to fill customer orders from matching raw rolls as determined by the optimal charting patterns, the demand fulfillment and stock usage details.

Figure 3:
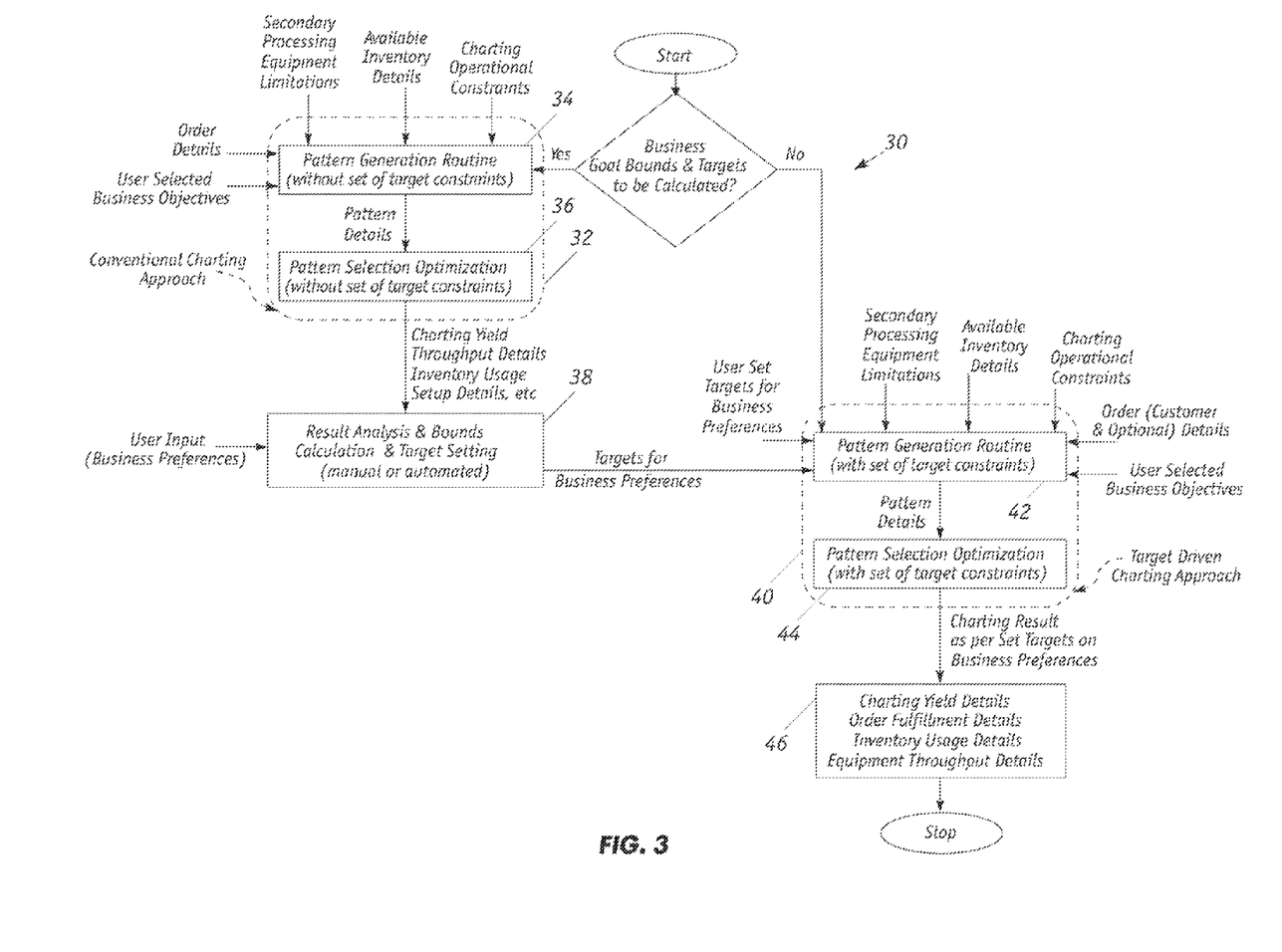
FIG. 3 is a flow chart implementing target driven charting.

As shown in FIG. 3, in the case where business goal bounds and targets are to be calculated, the target driven charting approach entails generating charting yield, secondary processing equipment throughput details, inventory usage details and secondary processing equipment setup details etc. This is typically accomplished using a conventional charting approach 32 as described in the Kapadi Patent. This charting approach comprises a pattern generation routine 34 that considers various parameters, including; (i) user selected business objectives, order details, secondary processing equipment limitations, (iii) available inventory details, and (iv) charting operational constraints to provide pattern details. Preferred exemplary charting batch details include charting batch order details such as order type (must-make order or optional order), width, length, diameter, core diameter, product type, preference for non-edge roll, maximum quantity, minimum quantity, rolls/sheets per delivery pack. Thereafter, a pattern selection optimization step 36 selects patterns from a generated list to result the charting yield, secondary processing equipment throughput, inventory usage details and secondary processing equipment setup information. These result details are considered in the result analysis and bounds calculation and target-setting step 38 in light of business preferences input by the user to yield calculated targets for business preferences. Both steps 34 and 36 operate without a set of target constraints.

Either the calculated targets business preferences or user prescribed targets business preferences are employed to in the target driven charting approach 40 wherein the business preferences data is processed in a pattern generation routine along with (i) secondary processing equipment limitations, (ii) available inventory data, (iii) charting operational constraints, (iv) order details, and (v) user selected business objectives to generate pattern details. Exemplary charting operational constraints include minimum width utilization of raw rolls and/or sheets, minimum length utilization of raw rolls and/or sheets, multiple stage or single stage charting, preference of specific order begin fulfilled from available inventory, preference to use similar product type to fulfill order. The aforelisted data along with the pattern data are used in a pattern selection optimization step 44 to generate the charting results, which include: charting yield, order fulfillment, inventory usage, equipment throughput details and the like as shown in item 46. Both steps 42 and 44 operate with a set of target constraints.

The foregoing has described the principles, preferred embodiments and modes of operation of the present invention. However, the invention should not be construed as being limited to the particular embodiments discussed. Thus, the above-described embodiments should be regarded as illustrative rather than as restrictive, and it should be appreciated that variations can be made in those embodiments by workers skilled in the art without departing from the scope of the present invention as defined by the following claims

What is claimed is:

1. A method of producing optimal charting patterns for charting of raw rolls/sheets from flat sheet industry, the method implemented by a processing system, the method comprising of:
   (a) receiving user selected business objectives that comprises receiving business goals that include maximum allowed quantity or percentage loss during charting and a business goal that is selected from the group consisting of maximum utilization of available inventory of raw or semi-processed rolls and/or sheets, minimization of the number of raw rolls and/or raw sheet quantity required to be manufactured to fulfill charting batch orders, minimization of deviation of 'quantity delivered' from 'target order quantity' for each must make customer order, minimization of quantity produced for optional orders, maximization of throughput of all secondary processing equipment, minimization of setup required on secondary processing equipment and combination thereof;
   (b) receiving user selected business preferences that at least include maximum number of optional orders that could be used and maximum allowable total quantity of optional orders that could be produced;
   (c) setting targets for the user selected business preferences to prioritize business goals for a charting batch by determining target values by analysis of the results obtained from charting system without inclusion of user business preference based target constraints and wherein the step of determining target values comprises:
      i. knowing lower and/or upper bounds for values of one or more of the user selected business objectives by solving a charting system with one or more of the user selected business objectives, charting batch details, secondary processing equipment details and charting operation constraints;
      ii. analyzing the bounds to determine trade-off between the user selected business objectives; and iii. using the bounds and the trade-off information to generate the targets for the user selected business preferences;

(d) establishing charting constraint sets;

(e) generating charting patterns based on the user selected business objectives and the targets for the user selected business preferences; and (f) selecting the optimal charting patterns from the generated charting patterns based on the targets for the user selected business preferences using an objective function, wherein the objective function includes terms related to the user selected business objectives.

2. The method according to claim 1, wherein the step of establishing charting constraint sets comprises including user business preference based targets constraints.

3. The method according to claim 1, wherein the step of establishing charting constraint sets comprises including one or more charting constraint sets that are selected from the group consisting of charting batch details, secondary processing equipment limitations, charting operational constraints, and combinations thereof.

4. The method according to claim 3, wherein the charting batch details are selected from the group consisting of charting batch order details including order type, width, length, diameter, core diameter, product type, preference for non-edge roll, maximum quantity, minimum quantity, rolls/sheets per delivery pack, and combinations thereof.

5. The method according to claim 3, wherein the charting batch details are selected from the group consisting of charting batch inventory details including width, length, diameter, core diameter, bad spot defects, dead zone defects, number of available inventory rolls, product type, time to expiry, preference for usage, and combinations thereof.

6. The method according to claim 3, wherein the secondary processing equipment limitation is selected from the group consisting of maximum and/or minimum width of one of raw roll and sheet handled, maximum and/or minimum length and/or diameter of raw roll handled, maximum and/or minimum width of one of product roll and sheet handled, maximum and/or minimum length and/or diameter of product roll handled, edge trim required, number of available knives, minimum and/or maximum distance between two knives, maximum and/or minimum number of backstand rolls handled, maximum and/or minimum weight of raw rolls or sheets at backstand, maximum and/or minimum length of rolls at backstand, number of stackers, width consumption by knife and combination thereof.

7. The method according to claim 3, wherein the charting operational constraints are selected from the group consisting of minimum width utilization of raw rolls and/or sheets, minimum length utilization of raw rolls and/or sheets, multiple stage or single stage charting, preference of specific order being fulfilled from available inventory, preference to use similar product type to fulfill order, and combination thereof.

8. The method according to claim 1, wherein the step of receiving user selected business preferences includes receiving preferences for minimum charting yield and/or maximum charting loss percentage.

9. The method according to claim 1, wherein the user selected business preferences further include maximum percentage/fraction for quantity produced for optional orders.

10. The method according to claim 1, wherein the step of receiving user selected business preferences includes receiving preferences for minimum throughput level for secondary processing equipment, or maximum number of charting patterns allowed to minimize set-ups and combination thereof.

11. The method according to claim 1, wherein the step of receiving user selected business preferences includes receiving preferences for minimum and/or maximum percentage/quantity of available inventory utilized, minimum and/or maximum percentage of order quantity fulfilled from inventory, minimum and/or maximum percentage of overall charting batch order quantity fulfilled from inventory and combination thereof.

12. The method according to claim 1, wherein the charting patterns are employed for charting of raw rolls/sheets that are made of plastic, metal, and/or paper.

13. The method according to claim 1, wherein step (a) comprises receiving business goals that include minimization of quantity produced for optional orders wherein the optional orders comprise customer orders for future delivery and wherein step (f) comprises selecting the optimal charting patterns so as to limit total quantity of rolls/sheets charted based in part on the optional orders.

14. A method of producing optimal charting patterns for charting of raw rolls/sheets from flat sheet industry, the method implemented by a processing system, the method comprising of:

(a) receiving user selected business objectives that comprises receiving business goals that include maximum allowed quantity or percentage loss during charting and business goals that are selected from the group consisting of maximum utilization of available inventory of raw or semi-processed rolls and/or sheets, minimization of the number of raw rolls and/or raw sheet quantity required to be manufactured to fulfill charting batch orders, minimization of deviation of 'quantity delivered' from 'target order quantity' for each must make customer order, minimization of quantity produced for optional orders, maximization of throughput of all secondary processing equipment, minimization of setup required on secondary processing equipment and combination thereof;

(b) receiving user selected business preferences that at least include maximum number of optional orders that could be used and maximum allowable total quantity of optional orders that could be produced;

(c) setting targets for the user selected business preferences to prioritize business goals for a charting batch by getting target values directly from a user and knowing lower and/or upper bounds for values of one or more of the user selected business objectives;

(d) establishing charting constraint sets;

(e) generating charting patterns based on the user selected business objectives and the targets for the user selected business preferences; and (f) selecting the optimal charting patterns from the generated charting patterns based on the targets for the user selected business preferences using an objective function, wherein the objective function includes terms related to the user selected business objectives.

15. The method according to claim 14, wherein the step of establishing charting constraint sets comprises including user business preference based targets constraints.

16. The method according to claim 15, wherein the step of receiving user selected business preferences includes receiving preferences for minimum and/or maximum percentage/quantity of available inventory utilized, minimum and/or maximum percentage of order quantity fulfilled from inventory, minimum and/or maximum percentage of overall charting batch order quantity fulfilled from inventory and combination thereof.

17. The method according to claim 14, wherein the step of establishing charting constraint sets comprises including one or more charting constraint sets that are selected from the group consisting of charting batch details, secondary processing equipment limitations, charting operational constraints, and combinations thereof.

18. The method according to claim 17, wherein the charting operational constraints are selected from the group consisting of minimum width utilization of raw rolls and/or sheets, minimum length utilization of raw rolls and/or sheets, multiple stage or single stage charting, preference of specific order being fulfilled from available inventory, preference to use similar product type to fulfill order, and combination thereof.

19. The method according to claim 17, wherein the charting batch details are selected from the group consisting of charting batch order details including order type, width, length, diameter, core diameter, product type, preference for non-edge roll, maximum quantity, minimum quantity, rolls/sheets per delivery pack, and combinations thereof.

20. The method according to claim 17, wherein the charting batch details are selected from the group consisting of charting batch inventory details including width, length, diameter, core diameter, bad spot defects, dead zone defects, number of available inventory rolls, product type, time to expiry, preference for usage, and combinations thereof.

21. The method according to claim 17, wherein the secondary processing equipment limitation is selected from the group consisting of maximum and/or minimum width of one of raw roll and sheet handled, maximum and/or minimum length and/or diameter of raw roll handled, maximum and/or minimum width of one of product roll and sheet handled, maximum and/or minimum length and/or diameter of product roll handled, edge trim required, number of available knives, minimum and/or maximum distance between two knives, maximum and/or minimum number of backstand rolls handled, maximum and/or minimum weight of raw rolls or sheets at backstand, maximum and/or minimum length of rolls at backstand, number of stackers, width consumption by knife and combination thereof.

22. The method according to claim 14, wherein the step of receiving user selected business preferences includes receiving preferences for minimum charting yield and/or maximum charting loss percentage.

23. The method according to claim 14, wherein the user selected business preferences further include maximum percentage/fraction for quantity produced for optional orders.

24. The method according to claim 14, wherein the step of receiving user selected business preferences includes receiving preferences for minimum throughput level for secondary processing equipment, or maximum number of charting patterns allowed to minimize set-ups and combination thereof.

25. The method according to claim 14, wherein the charting patterns are employed for charting of raw rolls/sheets that are made of plastic, metal, and/or paper.

26. The method according to claim 14, wherein step (a) comprises receiving business goals that include minimization of quantity produced for optional orders wherein the optional orders which comprise customer orders for future delivery and wherein step (f) comprises selecting the optimal charting patterns so as to limit total quantity of rolls/sheets charted based in part on the optional orders.

* * * * *